US005171939A

United States Patent [19]

Shotey

[11] Patent Number: 5,171,939

[45] Date of Patent: Dec. 15, 1992

[54] ALIGNABLE ELECTRICAL OUTLET

[76] Inventor: Michael J. Shotey, 7733 E. Cypress, Scottsdale, Ariz. 85257

[21] Appl. No.: 596,678

[22] Filed: Oct. 12, 1990

Related U.S. Application Data

[63] Continuation-in-part of Ser. No. 265,262, Oct. 31, 1988, Pat. No. 4,988,832.

[51] Int. Cl.[5] ........................ H02G 3/14

[52] U.S. Cl. ........................ 174/67; 174/57; 267/158

[58] Field of Search ........................ 174/57, 67; 220/3.7, 220/242; 267/158, 164

[56] References Cited

U.S. PATENT DOCUMENTS 1,752,322 4/1930 Adam ........................ 220/3.7 X 2,665,330 1/1954 Wong ........................ 174/57

4,988,832 1/1991 Shotey ........................ 174/67

FOREIGN PATENT DOCUMENTS 644330 7/1962 Canada ........................ 174/53

*Primary Examiner*—Leo P. Picard

*Assistant Examiner*—David A. Tone

*Attorney, Agent, or Firm*—Cahill, Sutton & Thomas

[57] ABSTRACT

A bracket for supporting an electrical socket unit within an electrical outlet box includes elements for realigning the bracket relative to the outlet box and elements for laterally and longitudinally supporting the bracket within the outlet box at any realigned location. Pivot elements for pivotally attaching a cover and lock elements for locking the cover are disclosed.

27 Claims, 2 Drawing Sheets

ALIGNABLE ELECTRICAL OUTLET

CROSS REFERENCE TO RELATED APPLICATION

The present application is a continuation in part application of a copending application entitled "Recessed Electrical Outlet With Cover", assigned U.S. patent Ser. No. 265,262, filed Oct. 31, 1988, now U.S. Pat. No. 4,988,832, and describing an invention of the present inventor.

BACKGROUND OF THE INVENTION

1. Field of the Invention

The present invention relates to electrical outlets and, more particularly, to an alignable electrical outlet.

2. Description of the Prior Art

Electrical outlets for both home and commercial use are generally attached by nails or other means to studs of a supporting wall framing. Usually such studs are vertically aligned. When so aligned, the attached electrical outlet is essentially vertically aligned and perpendicular to the floor. In the event the stud is misaligned due to an error in framing the wall or in the event the stud is warped, the side of the stud to which an electrical box is to be attached may not be vertical. The resulting nonverticality of the electrical outlet is readily visually apparent. An awareness of such nonalignment is often found objectionable, particularly in residences, and the nonalignment casts aspersions upon the quality of construction. The resulting poor impression created may affect salability of the residence or its price.

To shim an electrical outlet to compensate for nonvertically aligned or warped studs is time consuming and thereby increases the cost of installation. If realignment of the electrical outlet is effected after the wall board or other wall surface has been attached to the framing, substantial additional time and costs are involved.

The visually perceivable portion of an electrical outlet includes a cover plate having holes therein for access to a switch, an electrical socket or a pair or more of electrical sockets. The switch unit or electrical socket unit is attached to an outlet box by a pair of machine screws threadedly engaging threaded apertures of the box. A slot is formed at each end of the switch unit or electrical socket unit to penetrably receive the machine screws. This pair of slots permit some realignment of the electrical socket to align it vertically; however, the range of adjustment is limited. The cover plate, being keyed to the switch unit or electrical socket unit, is not independently alignable and will reflect the alignment of the switch unit or electrical socket unit. Generally, an outlet box houses a substantial number of heavy gauge electrical conductors and wire nuts for the requisite interconnections. The mass represented by such conductors and wire nuts may place a limitation upon the degree of misalignment of the electrical socket with respect to the box which can be accommodated.

SUMMARY OF THE INVENTION

An electrical outlet box, attachable to a stud or other wall framing member, includes a bracket attachable to the box for supporting a electrical socket unit within the box. A pair of spaced apart parallel slots in the bracket accommodate penetratable insertion of machine screws to secure the bracket to threaded studs extending within the box; the slots permit angular realignment of the bracket within the box. A skirt, defined by four sides, extends from the bracket. A ridge is disposed centrally across each side of the skirt. Each of the four ridges bears against the corresponding surface of the box irrespective of the degree of permissible misalignment of the bracket with the box to provide support for the bracket within the box. A pivotal cover extends from an exterior flange of the bracket to cover the electrical socket unit. A spring loaded lock maintains the cover closed.

It is therefore a primary object of the present invention to provide apparatus for realigning a switch unit or an electrical socket unit with regard to a supporting electrical outlet box.

Another object of the present invention is to provide an electrical socket unit supporting bracket adjustably attachable within an electrical outlet box.

Still another object of the present invention is to provide supporting elements for a bracket within an electrical outlet box, which elements support the bracket throughout its range of alignment adjustment with respect to the box.

Yet another object of the present invention is to provide a cover for a recessed electrical socket, which cover is pivotally attached to a bracket supporting the electrical socket.

A further object of the present invention is to provide an angularly alignable bracket for supporting a recessed electrical socket unit.

A still further object of the present invention is to provide a spring lock for a cover pivotally attached to a bracket supporting a recessed electrical socket unit.

A yet further object of the present invention is to provide a method for angularly aligning an electrical socket unit supporting bracket subsequent to mounting of a enclosing electrical outlet box.

These and other objects of the present invention will become apparent to those skilled in the art as the description there proceeds.

BRIEF DESCRIPTION OF THE DRAWINGS

The present invention will be described with greater clarity and specificity with reference to the following drawings, in which.

DESCRIPTION OF THE PREFERRED EMBODIMENT

Figure 1:
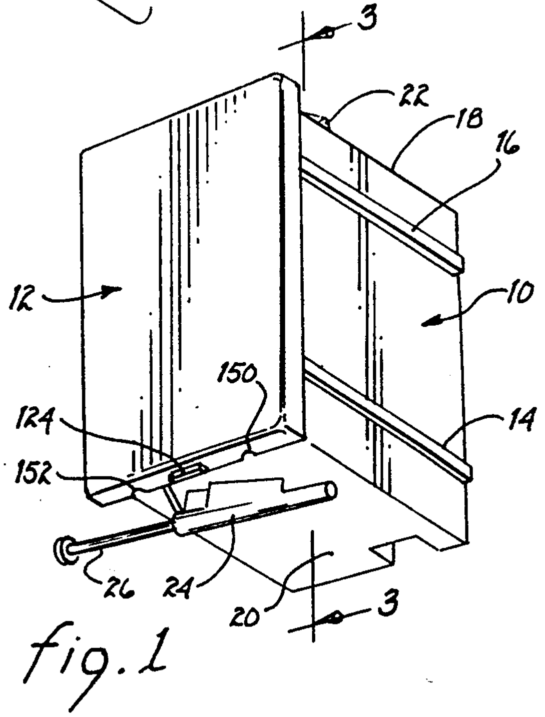
FIG. 1 is an isometric view of a covered electrical outlet box.

An electrical outlet box 10, supporting a recessed electrical socket protected by a pivotable cover 12, is illustrated in FIG. 1. The box may include a plurality of ribs 14, 16 disposed on opposed sides to add rigidity to the respective sides. Top and bottom surfaces 18, 20 of the outlet box may include guides 22, 24 for slidingly retaining nails 26 to be used in attaching the outlet box to a conventional wooden stud. Other means for attaching the outlet box to wall framing may be used. Due to carelessness in assembling the wall framing, the stud to which outlet box 10 is to be attached may be canted off vertical. Under certain circumstances, a stud may be warped and thereby provide a nonvertical surface at the point for attaching the outlet box. Since such nonvertical alignment is reflected by a corresponding skewed or nonvertical alignment of cover 12 and corresponding nonvertical alignment of the electrical socket, the nonvertical alignment is readily visually apparent to even a casual observer. Such nonalignment is generally perceived to reflect low quality construction or poor quality construction materials. In either event, the perceived quality of the dwelling or building is reduced with commensurate effect upon desirability and salability.

Figure 2:
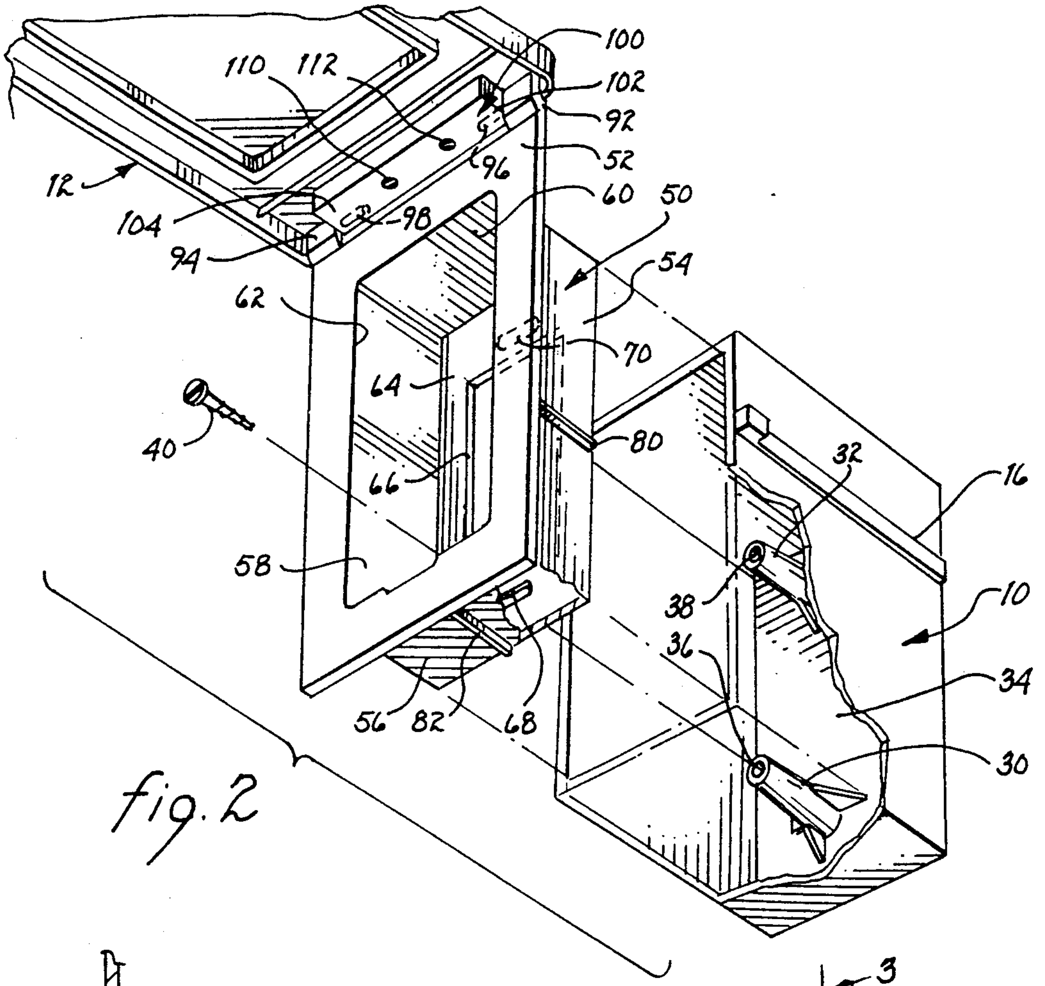
FIG. 2 is an exploded view of the components of an electrical outlet box.
Figure 3:
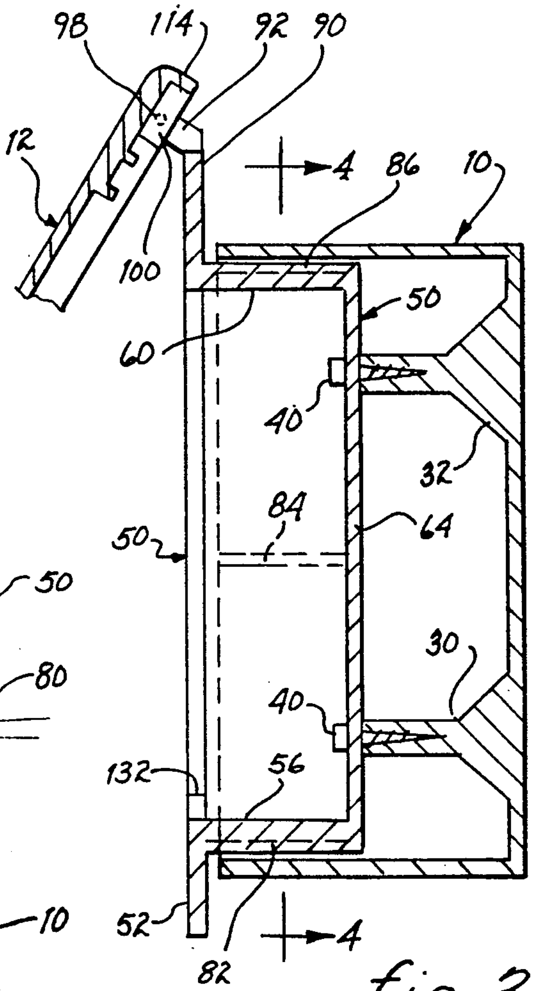
FIG. 3 is a cross sectional view taken along lines 3—3, as shown in FIG. 1.
Figure 4:
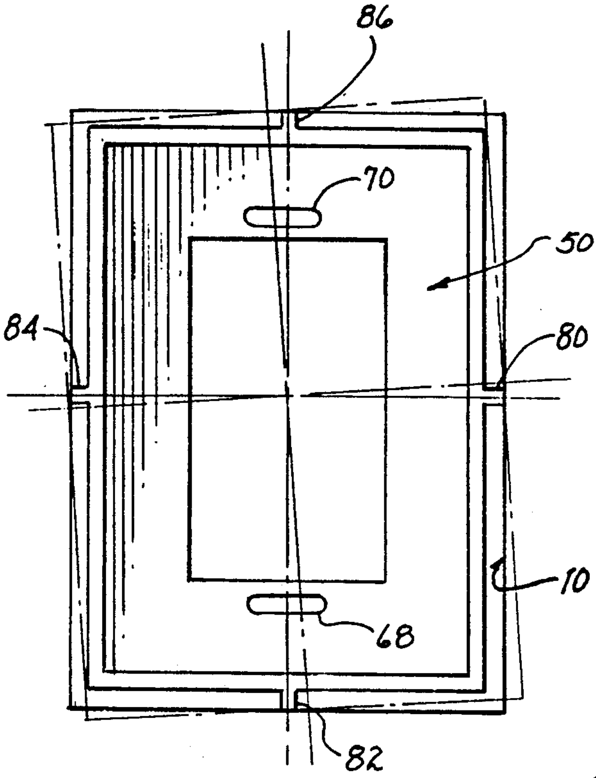
FIG. 4, taken along lines 4—4 as shown in FIG. 3, illustrates the alignment range of the housed bracket.

Referring jointly to FIGS. 2, 3 and 4, apparatus will be described for realigning to a vertical axis the visible electrical socket and its cover in compensation for a nonvertically aligned outlet box. Outlet box 10 includes a pair of studs 30, 32 extending from rear wall 34. The studs include threaded bores 36, 38 for receiving machine screws. In the event outlet box 10 and its studs 30, 32 are of plastic, the bores need not be threaded if metal screws, such as screw 40, are used.

A bracket 50 includes a planar frame 52 having four sides 54, 56, 58 and 60 depending from a rectangular aperture 62. A base 64 interconnects the four sides and in combination with the sides forms a box like element. An opening 66 is formed in base 64 to receive and expose the sockets of an electrical socket unit; alternatively, a switch unit may be mounted therein. A pair of slots 68, 70 correspond with bores 36, 38, respectively. Screws 40 penetrable engage each of slots 68, 70 for threaded engagement with the respective one of bores 36, 38. Upon tightening of the screws, bracket 50 is thereby secured to outlet box 10.

Slots 68, 70 permit angular repositioning of bracket 50 with respect to outlet box 10 to the extent defined by the length of the slots. Such angular reorientation accommodates nonalignment of the bracket with the outlet box to a defined degree. Since substantial loads are imposed upon bracket 50 during use, means in addition to screws 40 and its engaging elements must be employed to withstand the loads irrespective of how the bracket is aligned with the outlet box. Ribs 80, 82, 84 and 86 extend centrally across sides 54, 56, 58 and 60. Each of these ribs is of a height sufficient to bear against the adjacent interior wall surface of outlet box 10 and thereby provide horizontal and vertical support for the bracket within the outlet box. Rotation of bracket 50 with respect to outlet box 10, to the extent accommodated by slots 68, 70, results in substantial lateral movement of the ribs with respect to their respective adjacent outlet box surfaces. However, such rotation produces only minimal lateral displacement of the ribs from their respective outlet box surfaces and support for the bracket will be continuously maintained throughout the range of realignment of the bracket with respect to the outlet box.

The electrical socket unit, of conventional configuration, includes a pair of slots at opposed ends for attachment purposes. These slots may be coincident with slots 68, 70 and with bores 36, 38 of studs 30, 32. Accordingly, screws 40 may be used to attach both bracket 50 and the electrical socket unit to the outlet box. Alternatively, the electrical socket unit may be attached to bracket 50 only and such attachment may be used to align the electrical socket unit relative to the bracket.

The attachment mechanism and pivot means for cover 12 will be described with joint reference to FIGS. 1, 2 and 3. Frame 52 includes an upwardly extending flange 90 terminated by a pair of arms 92, 94. Pins 96, 98 extend from arms 92, 94 toward one another. A block 100 includes receiving means 102, 104, such as slots, for receiving pins 96, 98. By attaching block 100 to the cover via screws 110, 112 or the like, cover 12 is pivotally attached to arms 92, 94. By offsetting the arms, as depicted in both FIGS. 2 and 3, clearance for rear skirt 114 of cover 12 is provided to permit substantial upward pivotal movement of the cover past horizontal.

Figure 5:
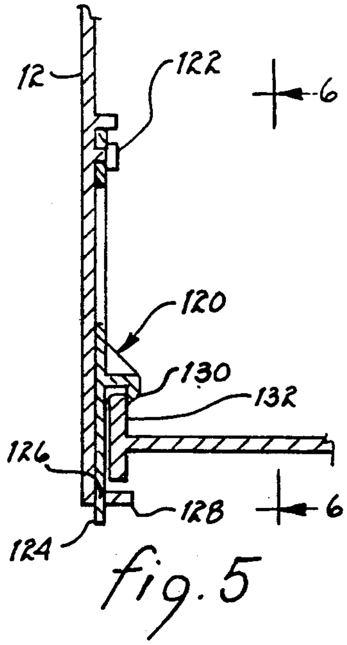
FIG. 5 is a side view illustrating a lock for the cover.
Figure 6:
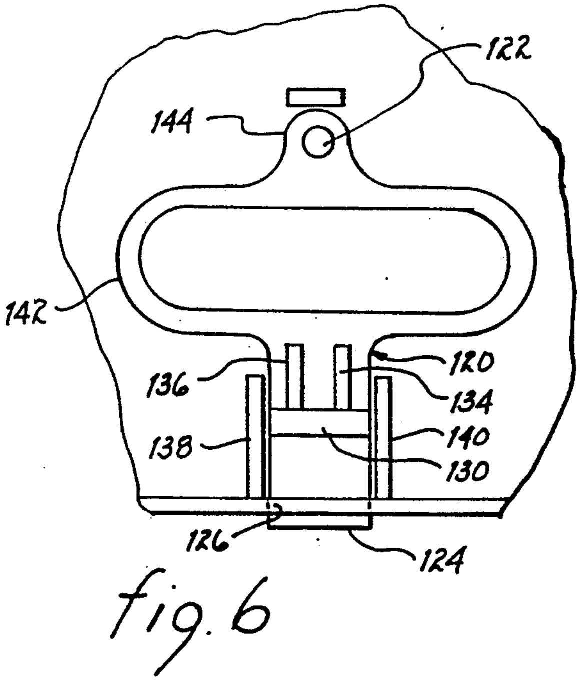
FIG. 6 is a view taken along lines 6—6, as shown in FIG. 5.

To retain cover 12 in the closed position, a lock may be used. Referring jointly to FIGS. 5 and 6, the construction of lock 120 will be described. The upper end of lock 120 is secured to the inside of cover 12 by a stud 122 or other mechanism for precluding vertical movement of the upper end of the lock. A tab 124 extends through aperture 126 in flange 128, which flange extends inwardly from the lower edge of cover 12. A lip 130 is displaced from tab 124 a sufficient distance to receive therebetween a ledge 132 extending upwardly from side 56 of bracket 50. Webs 134, 136 may be employed to stabilize and structurally support lip 130. Guides 138, 140 are disposed on opposed sides of tab 124 to guide the tab through vertical movement thereof. A downward force to be exerted upon lip 130 to urge it into engagement with ledge 132 is provided by oval spring element 142. This element interconnects tab 124 with upper end 144 secured in place by stud 122. Upon upward movement of tab 124, lip 130 will be displaced upwardly and become free of ledge 132. Thereafter, cover 12 may be pivoted outwardly and upwardly. Upon closure of cover 12, the bevel of lip 130 may force it, upon contact with ledge 132, upwardly to ultimately engage the ledge. Alternatively, tab 124 may be manually forced upwardly to permit lip 130 to clear ledge 132 and thereafter lockingly engage the ledge.

As noted in FIG. 1, flange 128 of cover 12 may include notches 150, 152 for receiving the electrical conductors extending from any plugs plugged into the electrical socket supported by bracket 50.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. Apparatus for aligning an electrical socket unit with respect to an electrical outlet box having four sides, a bottom and a pair of studs extending from the bottom, said apparatus comprising in combination:

a) a bracket having an apertured frame, four sides depending from said frame, a base extending across said four sides, said base including an aperture for mounting the socket of the socket unit;

b) means for securing said base to the pair of studs extending from the bottom of the electrical box, said securing means including means for rotating said bracket relative to the outlet box to realign said sides of said bracket with the sides of the outlet box; and c) means for supporting each of said sides of said bracket relative to the corresponding one of the sides of the outlet box at any point of realignment of said bracket with the outlet box.

2. The apparatus as set forth in claim 1 wherein said supporting means includes a ridge extending from each of said sides of said bracket.

3. The apparatus as set forth in claim 2 wherein each of said ridges is centrally located with respect to the respective one of said sides of said bracket.

4. The apparatus as set forth in claim 3 wherein each of said ridges extends from a location in proximity to said frame to a location in proximity to said base of said bracket.

5. The apparatus as set forth in claim 4 wherein each of said ridges extends from opposed edges of the respective one of said sides of said bracket.

6. The apparatus as set forth in claim 5 wherein each of said ridges is rectangular in lateral cross section.

7. The apparatus as set forth in claim 1 including a cover for enclosing said frame to protect the electrical socket to be mounted within said bracket.

8. The apparatus as set forth in claim 7 wherein said sides of said bracket are dimensioned to recess the electrical socket sufficiently to locate an electrical plug plugged into the electrical socket essentially within said bracket and wherein said cover includes means for accommodating passage of an electrical conductor extending from the plugged in electrical plug intermediate said cover and said frame.

9. The apparatus as set forth in claim 7 including means for pivotally securing said cover with said frame.

10. The apparatus as set forth in claim 9 wherein said securing means comprises a pair of pins and retaining means for pivotally supporting said pins.

11. The apparatus as set forth in claim 10 wherein said securing means includes arm means extending from said frame for supporting said pins and wherein said retaining means includes a block removably secured to said cover.

12. The apparatus as set forth in claim 7 including lock means for locking said cover in a closed position.

13. The apparatus as set forth in claim 12 wherein said lock means includes a ledge extending from said frame and a translatable lip for selectively engaging said ledge.

14. The apparatus as set forth in claim 13 including tab means for urging translation of said lip in a first direction to unlock said lock means and spring means for urging translation of said lip in a second direction to lock said lock means.

15. The apparatus as set forth in claim 14 wherein said spring means comprises an oval element.

16. The apparatus as set forth in claim 12 wherein said sides of said bracket are dimensioned to recess the electrical socket sufficiently to locate an electrical plug plugged into the electrical socket essentially within said bracket and wherein said cover includes means for accommodating passage of an electrical conductor extending from the plugged in electrical plug intermediate said cover and said frame.

17. The apparatus as set forth in claim 7 wherein the depth of said cover in combination with the recess defined by said bracket is sufficient to enclose an electrical plug plugged into the electrical socket upon closing of said cover and including means for accommodating passage of the electrical conductor extending from the plugged in electrical plug intermediate said cover and said bracket.

18. A method for aligning an electrical socket unit with respect to an electrical outlet box having four sides, a bottom and a pair of studs extending from the bottom, said method comprising the steps of:

a) mounting the electrical socket unit in a bracket having an apertured frame, four sides depending from the frame, a base extending across the four sides and an aperture disposed in the base to accommodate a socket of the electrical socket unit;
b) securing the base to the pair of studs extending from the bottom of the electrical box;
c) rotating the bracket relative to the outlet box to realign the sides of the bracket relative to the sides of the outlet box; and
d) supporting each of the sides of the bracket relative to the corresponding one of the sides of the outlet box at any point of realignment of the bracket with the outlet box.

19. The method as set forth in claim 18 including the step of enclosing the recess defined by the sides of the base of the bracket with a cover.

20. The method as set froth in claim 19 including the step of pivoting the cover relative to the bracket.

21. The method as set forth in claim 20 including the step of locking the cover to the bracket.

22. The method as set forth in claim 21 including the step of enclosing an electrical plug plugged into the electrical socket upon closure of the cover.

23. A lock for locking the cover of an electrical outlet, said lock comprising in combination:

a) a ledge extending from the electrical outlet;
b) a translatable lip extending from the cover for selectively engaging said ledge;
c) tab means for urging translation of said lip in a first direction to disengage said lip with said ledge;
d) spring means for urging translation of said lip in a second direction to engage said lip with said ledge, said spring means including a flexible oval having one side secured to said lip; and
e) anchor means disposed on the cover for anchoring the other side of said oval.

24. The lock as set forth in claim 23 wherein said spring means is of plastic.

25. The lock as set forth in claim 23 including guide means for guiding translation of said lip.

26. The lock as set forth in claim 25 wherein said guide includes means for translating said lip in a third direction defined by an arc into and out of engagement with said ledge.

27. A lock for locking the cover of an electrical outlet, said lock comprising in combination:

a) a ledge;
b) a translatable lip for selectively engaging said ledge;
c) tab means for urging translation of said lip in a first direction to disengage said lip with said ledge;
d) spring means for urging translation of said lip in a second direction to engage said lip with said ledge, said spring means including a flexible oval having one side secured to said lip; and
e) anchor means for anchoring the other side of said oval.

* * * * *